United States Patent

Trepka et al.

[15] 3,694,515
[45] Sept. 26, 1972

[54] HALPHENYLLITHIUM INITIATORS FOR CONJUGATED DIENE POLYMERIZATION

[72] Inventors: William J. Trepka; Richard J. Sonnenfeld, both of c/o Phillips Petroleum Company, Bartlesville, Okla. 74003

[22] Filed: Aug. 3, 1970

[21] Appl. No.: 60,610

[52] U.S. Cl........260/665 R, 252/431 R, 260/94.2 M
[51] Int. Cl. ............................C07l 1/02, C08d 3/04
[58] Field of Search...................................260/665 R

[56] References Cited

UNITED STATES PATENTS

| | | |
|---|---|---|
| 3,067,265 | 12/1962 | Frampton et al.......260/665 R |
| 3,082,264 | 3/1963 | West et al..............260/665 R |
| 3,429,829 | 2/1969 | Kahle....................260/665 R |

OTHER PUBLICATIONS

Oikawa Chem. Abstracts 59(1963) Columns 14013–4.

*Primary Examiner*—Tobias E. Levow
*Assistant Examiner*—A. P. Demers
*Attorney*—Young and Quigg

[57] ABSTRACT

A method of polymerizing conjugated dienes which employs a halophenyllithium initiator prepared from the interreaction of an alkyllithium and a bromoiodobenzene is disclosed.

6 Claims, No Drawings

HALPHENYLLITHIUM INITIATORS FOR CONJUGATED DIENE POLYMERIZATION

This invention relates to halophenyllithium catalysts, or initiators.

In one of its more specific aspects, this invention relates to a process and initiator for the polymerization of a conjugated diene, and particularly of butadiene, isoprene and mixtures thereof which involves contacting the material to be polymerized with certain halophenyllithium compounds which act as initiators.

Polymerization of conjugated dienes is well known. In such polymerizations, an alkyllithium is employed as an initiator. It has now been determined that if the conventional alkyllithium is reacted with a bromoiodobenzene and the reaction product is employed as an initiator, polymerization products having properties differing from those produced by prior art methods can be produced.

According to the present invention there is provided an initiator for the polymerization of conjugated dienes which comprises the reaction product of an alkyllithium and a bromoiodobenzene compound.

Also, according to this invention there is provided a method for the polymerization reaction with an initiator comprising a reaction product of an alkyllithium and a bromoiodobenzene compound selected from the group consisting of 1-bromo-3-iodobenzene and 1-bromo-4-iodobenzene.

Accordingly, it is an object of this invention to provide a more simply prepared butadiene and isoprene polymerization initiator.

It is another object of this invention to provide a polymerization process which produces polymers having properties different from those produced from the same monomer by other initiators.

These and other objects of this invention will become evident in light of the following disclosure.

The method of this invention is employable under those operating conditions under which reactions polymerizing conjugated dienes are conventionally conducted. The method of this invention is particularly applicable to the polymerization of butadiene and isoprene and to the use of the reaction product of a butyllithium with 1-bromo-3-iodobenzene and 1-bromo-4-iodobenzene. Subsequent examples which illustrate the invention and which employ these materials are not to be considered as limiting the invention thereto, however.

The initiators of this invention are prepared in that manner conventionally employed in producing similar materials. These alkyllithium compounds contain in the range of one to 10 carbon atoms.

Specifically, the product of 1-bromo-3-iodobenzene and butyllithium can be prepared by introducing an organic solvent, for example, toluene, into a reactor, purging the reactor with nitrogen and then adding 1-bromo-3-iodobenzene and the butyllithium. The amount of toluene will be sufficient to act as a reaction diluent for the other components. The mixture is agitated at about 122° F. for about 3 hours, after which there is produced a solid product which can be employed in the reaction mixture in which it is formed, in which it is known as being in the "unwashed" state. Alternately, it can be separated from the reaction mixture, washed with a liquid such as cyclohexane in which it is negligibly soluble and employed in a liquid suspending medium, in which instance it is known as being in the "washed" state.

The product of 1-bromo-4-iodobenzene and butyllithium is prepared in the same manner as that employing 1-bromo-3-iodobenzene and employs the same mole relationship between the toluene and the reactants, and both the washed and the unwashed reaction product can be recovered. Reaction products of the bromoiodobenzene and other alkyllithiums can be prepared by the above method.

Preferably, the molar ratios of alkyllithium to bromoiodobenzene will be 0.9:1 to 2.3:1.

EXAMPLE I

Reaction products were recovered from two individual runs in which 1-bromo-3-iodobenzene was reacted with butyllithium. A third reaction product, for comparison purposes, was recovered from the reaction of 1,3-dibromobenzene with butyllithium. In each instance, the benzene dihalide and butyllithium were added to the toluene and the mixture was agitated for 3 hours, except for Mixture D which was reacted for 2 hours, at 122° F. Reaction mixtures and results were as follows:

TABLE I

| Reaction Mixture, mmoles | Initiator Designation | | | |
| --- | --- | --- | --- | --- |
|  | A | B | C | D |
| Toluene | 560 | 560 | 560 | 1020 |
| 1-Bromo-3-iodobenzene | 10 | 10 | 0 | 0 |
| 1,3-Dibromobenzene | 0 | 0 | 10 | 20 |
| Butyllithium | 10 | 20 | 10 | 20 |
| Product Property | | | | |
| Normality | 0.14 | 0.197 | 0.123 | 0.133 |
| Alkalinity as % by butyllithium | 91 | 69 | 76 | 83 |

The unwashed reaction mixtures A, B, and C were employed in the polymerization of isoprene in a cyclohexane diluent for various reaction times at 158° F.

In each instance, to 1000 parts of cyclohexane per hundred parts of monomer (phm) were added 100 parts of isoprene and 1 of the unwashed initiators A, B and C, in the concentration of milliequivalents per 100 parts by weight of monomer as shown below. The reaction was terminated and a conventional antioxidant, 2,2'-methylenebis(4-methyl-7-tert-butylphenol) in the amount of 1 part per 100 parts of rubber (phr) was added. The polymer was coagulated with alcohol and the dried polymers had the following properties.

TABLE II

| Run No. | initiator mixture | Reaction initiator, me/mhm | Reaction time, hrs. | Product Analysis | | | | |
| --- | --- | --- | --- | --- | --- | --- | --- | --- |
|  |  |  |  | conv. % | cis % | 3,4 addn. % | Inherent viscosity | H.I.[a] |
| 1 | C | 0.8 | 1.5 | 90 | 95 | 5.6 | 7.93 | — |
| 2 | A | 0.7 | 6 | 85 | 87 | 5.6 | 2.93 | 2.1 |
| 3 | A | 0.8 | 6 | 83 | 86 | 6.1 | 2.59 | — |
| 4 | A | 1.0 | 6 | 85 | 89 | 5.8 | 2.14 | — |
| 5 | B | 2.5 | 6 | 85 | 92 | 5.4 | 4.20 | 2.3 |
| 6 | B | 3.5 | 6 | 84 | 92 | 5.1 | 3.52 | — |
| 7 | D | 0.8 | 1.5 | 97 | 87 | 5.2 | 5.39 | 1.8 |

(a) Heterogeneity Index. The ratio of the weight average molecular weight ($M_w$) to the number average molecular weight ($M_n$) as determined by Gel Permeation Chromatography (GPC).

These data illustrate the operability of the initiator and method of this invention. They further indicate that initiator A, produced from an equal molar ratio of butyllithium and 1-bromo-3-iodobenzene, produced a relatively low inherent viscosity polymer having a relatively high cis content in comparison with the polymer produced with the initiator derived from the dibromobenzene. Further, the results of Runs 2, 5 and 7 demonstrate that initiators A and B produced polymers having broader molecular weight distribution (larger H.I.) than the control initiator D.

EXAMPLE II

A series of initiators was prepared in which the butyllithium concentration was varied in relation to the quantity of 1-bromo-3-iodobenzene, from a mole ratio of 1.25 to 1.75. One initiator was prepared for comparison purposes from 1,3-dibromobenzene. Reaction conditions and reactant concentrations were as indicated in Table III. Temperature was 122° F. Reaction time was 3 hours. The procedure was the same as in Example I.

TABLE III

| Reaction Mixture, mmoles | Initiator Designation | | | |
|---|---|---|---|---|
| | E | F | G | H |
| Toluene | 560 | 560 | 560 | 560 |
| 1-Bromo-3-iodobenzene | 10 | 10 | 10 | 0 |
| 1,3-Dibromobenzene | 0 | 0 | 0 | 10 |
| Butyllithium | 12.5 | 15.0 | 17.5 | 10 |
| Product Property | | | | |
| Normality | 0.157 | 0.170 | 0.190 | 0.127 |
| Alkalinity as % butyllithium | 85.6 | 81.4 | 73.8 | 82.6 |

The unwashed reaction mixtures E, F, G, and H were employed in the polymerization of isoprene in a cyclohexane diluent according to the procedure and recipe of Example I at constant reaction times of 20 hours at 158° F., with the results indicated in Table IV:

TABLE IV

| Reaction Mixture | initiator, mhm | conversion % | Cis, % | Product Analysis 3,4 addn. % | inherent viscosity |
|---|---|---|---|---|---|
| H | 0.8 | 91 | 90 | 5.2 | 5.97 |
| E | 0.8 | 88 | 88 | 5.7 | 3.12 |
| E | 0.7 | 90 | 94 | 5.2 | 3.32 |
| E | 1.5 | 83 | 84 | 6.1 | 2.01 |
| F | 2.5 | 56 | 90 | 4.7 | 3.25 |
| G | 3.0 | 52 | 94 | 5.3 | 2.85 |

These data indicate that a low inherent viscosity product of good cis content can be prepared with the 1.25 mole ratio mixture (Initiator E) and that at higher mole ratios of butyllithium to dihalobenzene of the mixtures, higher initiator concentrations are required. A substantial improvement is demonstrated in lower inherent viscosity polymer produced by initiators of the invention as compared to the prior art Initiator H.

EXAMPLE III

In another series of reactions, initiators were formulated by interreacting butyllithium and 1-bromo-4-iodobenzene according to the procedure of Example I. The interreaction was conducted under the conditions and with the compositions indicated in Table V.

TABLE V

| Reaction Mixture | Initiator Designation | | |
|---|---|---|---|
| | I | L | M |
| Toluene, mmoles | 560 | 560 | 560 |
| 1-bromo-4-iodobenzene, mmoles | 10 | 10 | 10 |
| Butyllithium, mmoles | 9 | 9 | 10 |
| Time, Hours | 2 | 0.25 | 0.25 |
| Temperature, °F. | 122 | 77 | 77 |
| Product Property | | | |
| Normality | 0.125 | 0.116 | 0.133 |
| Alkalinity as % butyllithium | 100 | 83.7 | 86.3 |

The reaction mixtures, I, L and M, were employed in the polymerization of isoprene according to the procedure of Example I in a cyclohexane diluent at constant reaction times of 15 hours at 158° F., with the results indicated in Table VI:

TABLE VI

| Reaction Mixture | initiator, mhm | conversion % | Cis % | Product Analysis 3,4 addn. % | Inherent viscosity |
|---|---|---|---|---|---|
| I | 2.50 | 76 | 90 | 5.3 | 1.30 |
| L | 2.50 | 66 | 93 | 6.0 | 1.28 |
| M | 2.25 | 71 | 96 | 5.6 | 1.97 |
| M | 2.50 | 82 | 98 | 5.8 | 1.78 |

The above data indicate the operability of the initiator and method of this invention when employing an initiator formulated from the interreaction of 1-bromo-4-iodobenzene. These data further indicate that those initiators formed from 1-bromo-4-iodobenzene are more active when prepared at temperatures of about 77° F. if prepared of reaction mixtures comprising an equal molar ratio of butyllithium to 1-bromo-4-iodobenzene.

EXAMPLE IV

Initiators were prepared by interreaction of 1-bromo-3-iodobenzene with butyllithium and by the interreaction of 1-bromo-4-iodobenzene with butyllithium. These were prepared at 1 to 1 mole reactant ratio at 77° F. according to the procedure of Example I.

The initiators were then employed in the polymerization of butadiene in a reaction mixture comprising 760 phm cyclohexane at 70° C. Results were as indicated in Table VII:

TABLE VII

| initiator | initiator, mhm | reaction time, hrs. | conv., % | cis % | trans % | Product Analysis vinyl % | inherent visc. |
|---|---|---|---|---|---|---|---|
| 1-Bromo-4-iodobenzene + Butyllithium | 2.00 | 24 | 41 | 84.9 | 10.6 | 4.5 | 1.57 |
| 1-Bromo-3- | 2.50 | 24 | 50 | 82.2 | 12.9 | 4.9 | 1.40 |

| | | | | | | | |
|---|---|---|---|---|---|---|---|
| iodobenzene + | 1.00 | 3 | 86 | 58.3 | 34.0 | 7.7 | 2.39 |
| Butyllithium | 2.50 | 3 | 89 | 48.8 | 42.5 | 8.7 | 1.19 |

The above data illustrate the operability of the initiator and method of this invention in the polymerization of butadiene.

The above data illustrate the operability of the initiators and the method of this invention as directed to the polymerization of isoprene and butadiene.

Summarily, the above data indicate that unexpected polymerization products are realized when employing polymerization initiators of 1-bromo-4-iodobenzene as compared to those results realized when employing 1,4-dibromobenzene.

It will be evident in light of the foregoing that various modifications can be made to the initiators and method of this invention. Such, however, are considered as being within the scope of the invention.

What is claimed is:

1. An initiator for the polymerization of conjugated dienes which consists essentially of the reaction product of an alkyllithium containing from one to 10 carbon atoms and a bromoiodobenzene selected from the group consisting of 1-bromo-3-iodobenzene and 1-bromo-4-iodobenzene.

2. An initiator for the polymerization of conjugated dienes which consists essentially of the reaction product of an alkyllithium containing from one to 10 atoms and a bromoiodobenzene selected from the group consisting of 1-bromo-3-iodobenzene and 1-bromo-4-iodobenzene, said alkyllithium being employed with said bromoiodobenzene in a molar ratio of from about 0.9:1 to about 2.3:1.

3. An initiator for the polymerization of conjugated dienes which comprises the reaction product of butyllithium and a bromoiodobenzene, said butyllithium being employed with said bromoiodobenzene in a molar ratio of from about 0.9:1 to about 2.3:1, said bromoiodobenzene being selected from the group consisting of 1-bromo-3-iodobenzene and 1-bromo-4-iodobenzene.

4. The initiator as defined in claim 3 in which said bromoiodobenzene is 1-bromo-3-iodobenzene.

5. The initiator as defined in claim 3 in which said bromoiodobenzene is 1-bromo-4-iodobenzene.

6. The initiator as defined in claim 3 in which said initiator is prepared from a 1 to 1 ratio of said butyllithium and said bromoiodobenzene, said initiator being prepared at 25° C.

* * * * *